(12) United States Patent
Li et al.

(10) Patent No.: US 8,149,998 B2
(45) Date of Patent: Apr. 3, 2012

(54) METHOD, SYSTEM AND DEVICE FOR PLAYING ENTERPRISE COLOR RINGBACK TONE

(75) Inventors: Guihua Li, Shenzhen (CN); Zhihong Sun, Shenzhen (CN); Yiqiang Bao, Shenzhen (CN); Zhibin Ren, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 276 days.

(21) Appl. No.: 12/511,232

(22) Filed: Jul. 29, 2009

(65) Prior Publication Data

US 2010/0020945 A1 Jan. 28, 2010

Related U.S. Application Data

(63) Continuation of application No. PCT/CN2007/003023, filed on Oct. 22, 2007.

(30) Foreign Application Priority Data

Jan. 29, 2007 (CN) .......................... 2007 1 0002484

(51) Int. Cl.
*H04M 1/64* (2006.01)
*H04M 1/56* (2006.01)
(52) U.S. Cl. ..................................... 379/76; 379/142.01
(58) Field of Classification Search .................... 379/76, 379/142.01
See application file for complete search history.

(56) References Cited

U.S. PATENT DOCUMENTS

| 2007/0019624 | A1* | 1/2007 | Munson et al. ............... 370/352 |
| 2007/0286372 | A1* | 12/2007 | DeMent et al. .......... 379/142.01 |
| 2008/0198976 | A1* | 8/2008 | Zhang et al. .................... 379/69 |
| 2009/0003338 | A1* | 1/2009 | Beauford ...................... 370/389 |
| 2009/0098863 | A1* | 4/2009 | Wang et al. ................ 455/414.1 |
| 2009/0110154 | A1* | 4/2009 | Colunga ......................... 379/45 |

FOREIGN PATENT DOCUMENTS

| CN | 1335015 | | 2/2002 |
| CN | 1556643 | | 12/2004 |
| CN | 1571323 | A | 1/2005 |
| CN | 1859494 | | 11/2006 |
| CN | 1874372 | | 12/2006 |

(Continued)

OTHER PUBLICATIONS

Extended European Search Report issued in corresponding European Patent Application No. 07816636.0, mailed Sep. 22, 2011.

(Continued)

*Primary Examiner* — Davetta W Goins
*Assistant Examiner* — Mohammad Islam
(74) *Attorney, Agent, or Firm* — Brinks Hofer Gilson & Lione

(57) ABSTRACT

A method for playing an enterprise color ringback tone is disclosed, including the following steps: establishing, by a service switching entity, a connection with a service access entity in accordance with an EVC access code; searching, by the service access entity, for a connection identifier of a destination terminal corresponding to a service identifier of the destination terminal in accordance with a correspondence relationship between the service identifier and the connection identifier of the terminal, and sending the connection identifier of the destination terminal to the service switching entity; and establishing, by the service switching entity, a connection between the source terminal and the destination terminal in accordance with the connection identifier of the destination terminal, and playing, by the service access entity, an enterprise CRBT to the source terminal. A system and a device for playing an enterprise color ringback tone are also disclosed.

13 Claims, 4 Drawing Sheets

FOREIGN PATENT DOCUMENTS

| | | |
|---|---|---|
| JP | 2000106685 | 4/2000 |
| WO | WO 2004095817 A1 | 11/2004 |
| WO | WO-2006001681 | 1/2006 |
| WO | WO 2006/128360 A1 | 12/2006 |

OTHER PUBLICATIONS

Office Action issued in corresponding Russian Patent Application No. 2009131502, mailed Jan. 18, 2011.

Written Opinion of the International Searching Authority issued in corresponding PCT Patent Application No. PCT/CN2007/003023, mailed Feb. 14, 2008.

Office Action issued in corresponding Chinese Patent Application No. 2007100024843, mailed May 22, 2009.

Lihttsinder et al., "Intelligent Networks" Engineering Enclyclopedia. Moscow, 2000.

* cited by examiner

METHOD, SYSTEM AND DEVICE FOR PLAYING ENTERPRISE COLOR RINGBACK TONE

CROSS-REFERENCE TO RELATED APPLICATIONS

This application is a continuation of International Patent Application No. PCT/CN2007/003023, filed on Oct. 22, 2007, which claims priority to Chinese patent application No. 200710002484.3, filed on Jan. 29, 2007; both of which are incorporated by reference herein their entireties.

FIELD OF THE INVENTION

The present invention relates to data transmission techniques in the field of communications, and in particular, to a method, a system and a device for playing an enterprise color ringback tone.

BACKGROUND OF THE INVENTION

Nowadays, more and more companies and organizations employ the Enterprise Virtual Centrex (EVC) service. These enterprise clients publish one EVC number to the public, and both internal users and external users of the enterprise can enjoy services provided by the EVC. For example, by dialing an access number of the EVC, a calling party can get various services such as manual forwarding, automatic forwarding, voice forwarding, and switchboard outwards calling. Manual forwarding refers to the service provided by an operator, with which calls are forwarded by the operator to a called party after inquiry; automatic forwarding means that the calling party directly dials a normal number of the called party, and the system establishes a connection between the calling party and the called party according to the normal number; voice forwarding is that the calling party speaks out another identifier of the called party, for example a name, via a voice system, and the system finds the number of the called party and establishes a session connection; and EVC outwards calling means that an enterprise member calls an external user of the enterprise through the switchboard, which may reduce communication cost for business.

Different from existing Color RingBack Tone (CRBT) services, the enterprise CRBT service can provide a CRBT customized for all internal users of the enterprise, without affecting personal CRBTs of the internal users, and can be customized according to time periods, departments or enterprises.

Mainly, there are two existing methods for implementing the enterprise CRBT service. FIG. 1 illustrates a flow chart of the first method, in which terminal A refers to a calling terminal, terminal B refers to a called terminal, a soft switching entity (SOFTX)/Service Switching Point (SSP) serving the terminal A is denoted as SOFTX/SSP(a), and an SOFTX/SSP serving the called terminal is denoted as SOFTX/SSP(b). The method generally includes the following steps.

Step 101: Terminal A sends to SOFTX/SSP(a) a call request, including telephone number information of terminal B which has subscribed for the enterprise CRBT service.

Step 102: Upon reception of the call request, SOFTX/SSP(a) sends to a Service Control Point (SCP) in an intelligence network an initial message (IDP), including telephone number information of terminal A and terminal B.

Step 103: The SCP determines that terminal B has subscribed for the enterprise CRBT service based on the telephone number information of terminal B, and sends to SOFTX/SSP(a) a CONNECT message including the telephone number information of terminal B and a routing code for a corresponding CRBT.

Step 104: If SOFTX/SSP(a) receives the CONNECT message and determines that the message also includes a resonant CRBT call identifier, which indicates the use of SSP resonance technology in this method for implementing the enterprise CRBT service, then SOFTX/SSP(a) sends to SOFTX/SSP(b) an Initial Address Message (IAM), including the telephone number information of terminal B requesting for a connection between terminal A and terminal B while blocking a ringback tone from terminal B. SOFTX/SSP(b) returns to SOFTX/SSP(a) an Address Complete Message (ACM) indicating the success of establishing the connection. Then SOFTX/SSP(a) sends to a CRBT Advanced Intelligence Peripheral (AIP) an IAM message including the CRBT routing code and establishes a connection with the CRBT AIP, then the CRBT AIP returns an ACM message to SOFTX/SSP(a), and therefore an enterprise CRBT played by the CRBT AIP can be heard at terminal A.

Step 105: An answer message (ANM) is sent to SOFTX/SSP(b) as soon as terminal B is off-hook.

Step 106: Upon reception of the ANM message, SOFTX/SSP(b) sends to the SCP an IDP message reporting the off-hook event of terminal B.

Step 107: Upon reception of the IDP message, the SCP sends to SOFTX/SSP(a) a release message (REL) instructing SOFTX/SSP(a) to tear down the connection to the CRBT AIP to stop the playing of the enterprise CRBT, meanwhile terminal A and terminal B start to communicate.

In the method illustrated by FIG. 1, different subsystems have to be used to implement the CRBT service and switchboard service; consequently, corresponding data have to be stored in both of the subsystems in order to implement the enterprise CRBT service, which increases data redundancy. In addition, this method is only applicable in a wired communication network.

The second existing method for implementing the enterprise CRBT service is illustrated in FIG. 2, where terminal A also refers to a calling terminal, terminal B also refers to a called terminal, and an SSP/Mobile Switching Center (MSC)/Gateway Mobile Switching Center (GMSC) serving terminal A is denoted as GMSC/MSC/SSP(a), and a GMSC/MSC/SSP serving the called terminal is denoted as GMSC/MSC/SSP(b). The method generally includes the following steps.

Step 201: Terminal A sends to GMSC/MSC/SSP(a) a call request including a telephone number of terminal B which has subscribed for the enterprise CRBT service. If terminal A is a fixed line user or a user of other mobile networks, the GSMC looks up subscription information of terminal B (T-CSI) in a Home Location Register (HLR); and if terminal A is a local user, the MSC looks up the T-CSI information in an HLR.

Step 202: According to the T_CSI information, GMSC/MSC/SSP(a) sends to an SCP, to which terminal B is homed, an IDP message including the telephone number information of terminal A and terminal B.

Step 203: The SCP issues a Request Report Basic call state model Event (RRBE) to GMSC/MSC/SSP(a), instructing GMSC/MSC/SSP(a) to report link connection status in real time.

Step 204: The SCP sends a CONNECT message to GMSC/MSC/SSP(a) to instruct GMSC/MSC/SSP(a) to establish a connection to a CRBT AIP, including the telephone number of terminal B and a CRBT routing code, and a roaming number of terminal B if terminals A and terminal B are terminals in different networks.

Step 205: Upon reception of the CONNECT message, GMSC/MSC/SSP(a) routes the call request to the CRBT AIP, the CRBT AIP furthers connects the call to GMSC/MSC/SSP (b), and finally GMSC/MSC/SSP(b) connects the call to terminal B.

Step 206: The CRBT AIP plays an enterprise CRBT customized by the called number to terminal A while blocking a ringback tone played from terminal B. When terminal B is off-hook, the switchboard CRBT AIP detects the occurrence of the event and stops playing the enterprise CRBT, and terminal A and terminal B can start to communicate. The connection between GMSC/MSC/SSP(a) and the CRBT AIP is interrupted if the communication ends.

In the method illustrated by FIG. 2, as terminal B is called via the CRBT AIP, the trunk link between the CRBT AIP and GMSC/MSC/SSP(a) is still occupied after the session between terminals A and B is enabled. Such a state will last until the communication between terminals A and terminal B ends, which may result in reduplicate links in implementation of the CRBT service, wastes trunk equipments, and thus degrades the parallel processing capability of the color AIP for CRBT service. In addition, during the call, the calling terminal is connected to the called terminal directly through the telephone number of the called terminal; consequently, only users of an enterprise within the same network can join the enterprise CRBT, which may limit terminals used by the users of the enterprise and cannot meet individualized requirements of the users in the enterprise.

SUMMARY OF THE INVENTION

Embodiments of the invention provide a method, a system and a device for playing an enterprise CRBT, in order to address the problems in the conventional art such as reduplicate links, data redundancy and the occupancy of a lot of trunk link resources. The method includes the steps of:

receiving, by a service switching entity, a call request including an EVC access code sent by a source terminal, and establishing a connection with a service access entity according to the EVC access code;

receiving, by the service access entity, a service identifier of a destination terminal sent by the source terminal, searching for a connection identifier of the destination terminal corresponding to the service identifier of the destination terminal according to a correspondence relationship between the service identifier and the connection identifier of the destination terminal, and sending the connection identifier of the destination terminal to the service switching entity; and establishing, by the service switching entity, a connection between the source terminal and the destination terminal according to the connection identifier of the destination terminal, and playing, by the service access entity, an enterprise CRBT to the source terminal.

An embodiment of the invention further provides a system for playing an enterprise CRBT, which includes a service switching entity and a service access entity, wherein:

the service access entity includes:

a first reception unit, adapted to receive a service identifier of a destination terminal sent by a source terminal;

a search unit, adapted to search a connection identifier corresponding to the service identifier of the destination terminal according to a correspondence relationship between the service identifier and the connection identifier of the terminal, and send the connection identifier of the destination terminal to the service switching entity; and a play unit, adapted to play an enterprise CRBT to the source terminal;

and the service switching entity includes:

a second reception unit, adapted to receive a call request including an EVC access code sent by the source terminal, and the connection identifier of the destination terminal sent by the service access entity;

a first connection unit, adapted to establish a connection with the service access entity according to the EVC access code; and a second connection unit, adapted to establish a connection between the source terminal and the destination terminal according to the connection identifier of the destination terminal.

An embodiment of the invention further provides a service switching entity including:

a reception unit, adapted to receive a call request including an EVC access code sent by a source terminal, and a connection identifier of a destination terminal sent by a service access entity;

a first connection unit, adapted to establish a connection with the service access entity according to the EVC access code; and a second connection unit, adapted to establish a connection between the source terminal and the destination terminal according to the connection identifier of the destination terminal.

According to the embodiments of the invention, first the service switching entity establishes the connection with the service access entity according to the EVC access code, and the service access entity searches for the connection identifier corresponding to the service identifier of the destination terminal according to a stored correspondence relationship between the service identifier and the connection identifier of the terminal, and sends the connection identifier of the destination terminal to the service switching entity; then the service switching entity establishes the connection between the source terminal and the destination terminal according to the connection identifier of the destination terminal, and the service access entity plays the enterprise CRBT to the source terminal; and finally the service access entity disconnects the connection with the service access entity when the destination terminal answers. Therefore, the problem of reduplicate links in playing of the enterprise CRBT is avoided, trunk link resources are saved and data redundancy is reduced. Because the enterprise CRBT service is deployed directly at the service access entity side, maintenance operations are simplified, time of the call process is shortened, system burden is reduced, and different network terminals can join the enterprise CRBT, therefore individualized requirements of users in the enterprise are met.

DETAILED DESCRIPTION OF THE EMBODIMENTS

The embodiments of the invention are applied in a system including a service switching entity, a service access entity and at least two terminals. First, a source terminal sends to the service switching entity a call request including an EVC access code, the service switching entity establishes a connection with the service access entity according to the EVC access code; then the source terminal sends a service identifier of a destination terminal to the service access entity, and the service entity searches for a connection identifier corresponding to the service identifier of the destination terminal according to a stored correspondence relationship between the service identifier and the connection identifier of the terminal and sends the connection identifier of the destination terminal to the service switching entity; next the service switching entity establishes a connection between the source terminal and the destination terminal according to the connection identifier of the destination terminal, and the service access entity plays a stored enterprise CRBT to the source terminal; finally, when the destination terminal answers, the service switching entity disconnects the connection with the service access entity. Therefore, a procedure for playing the enterprise CRBT to the source terminal is accomplished through the above steps. In an embodiment of the invention, the service switching entity can be an entity such as tandem office switch (MS)/MSC/GMSC, and the service access entity can be an entity such as switchboard AIP. Further, in an embodiment of the invention, a service control entity can be applied which may include an entity such as SCP.

The method of the invention will be described in details below with reference to the drawings.

Figure 1:
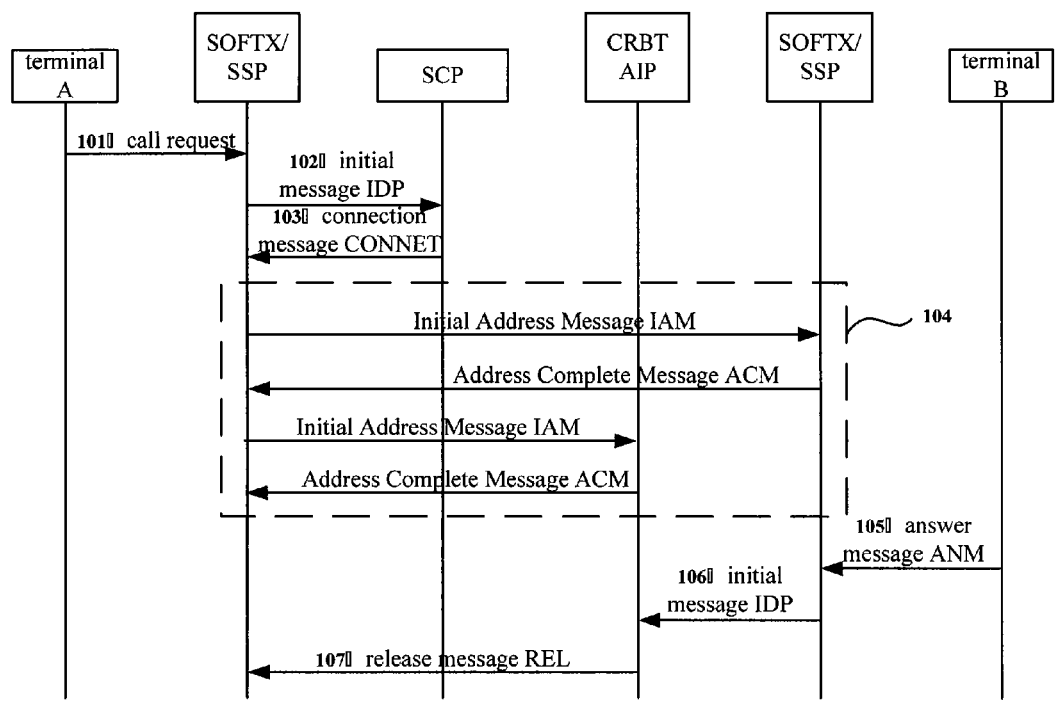
FIG. 1 is a flow chart of the first method for implementing the enterprise CRBT service in the conventional art.
Figure 2:
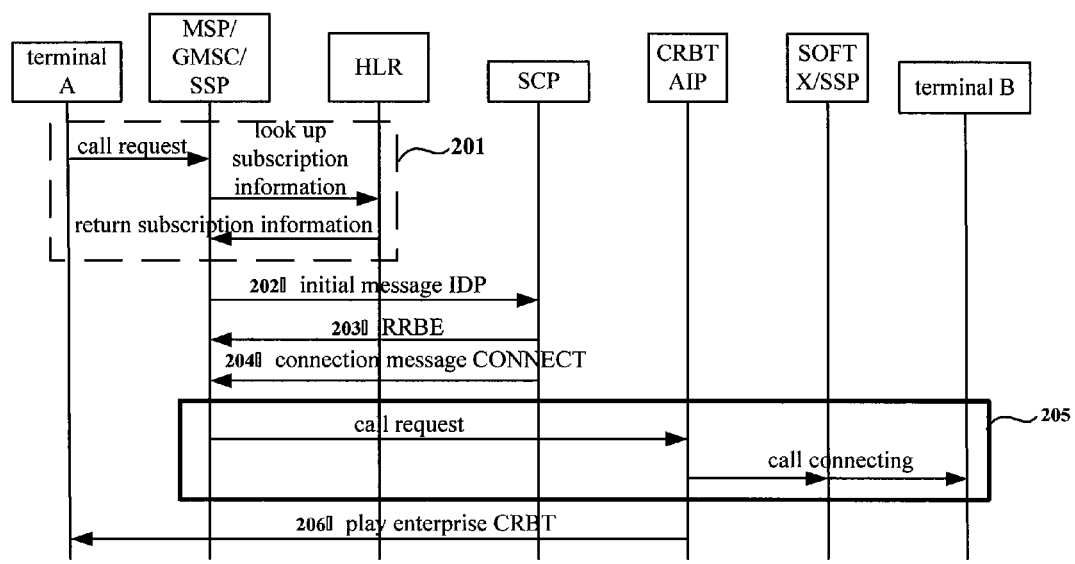
FIG. 2 is a flow chart of the second method for implementing the enterprise CRBT service in the conventional art.
Figure 3:
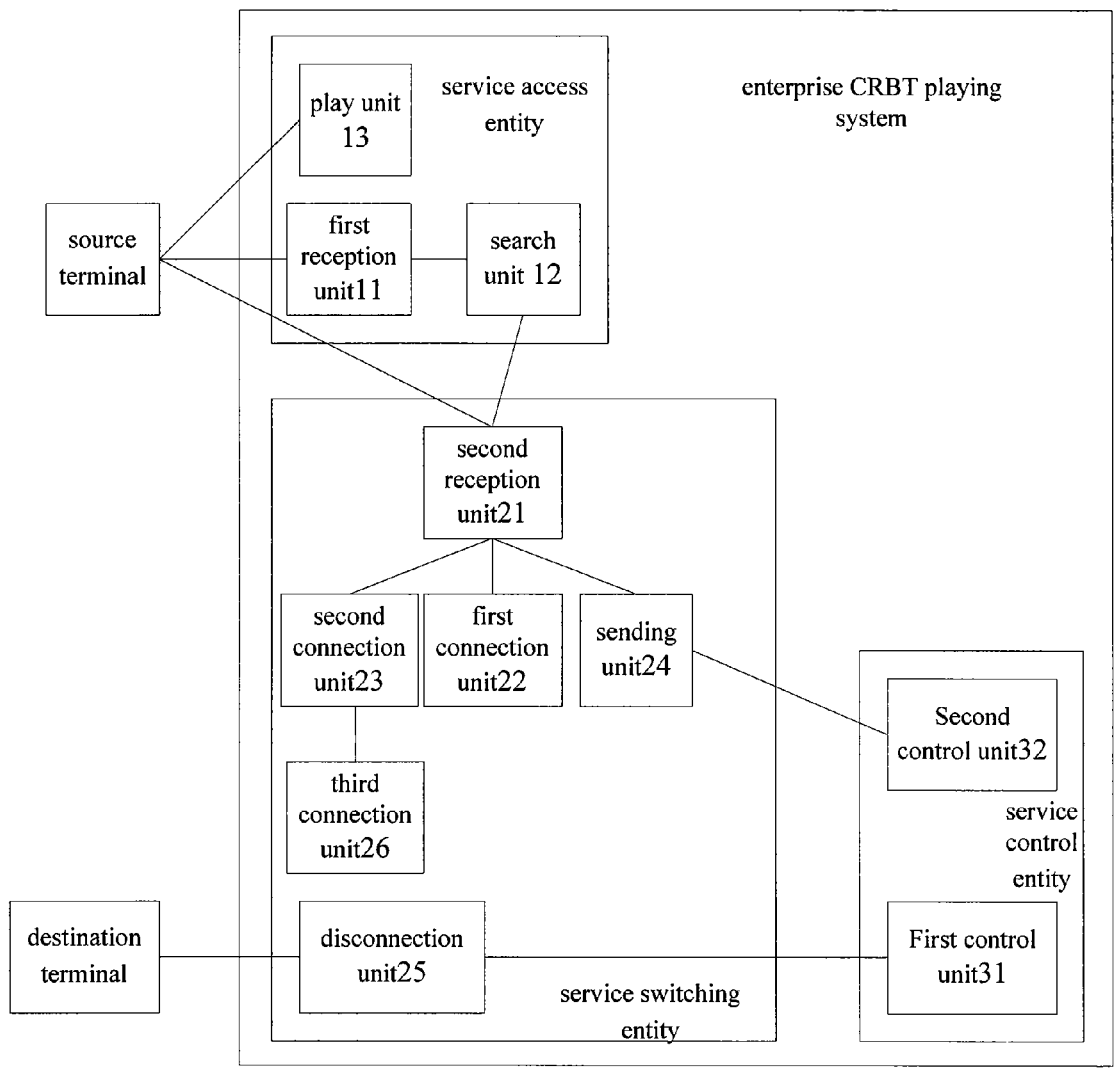
FIG. 3 is a structural diagram of a system for playing an enterprise CRBT according to an embodiment of the present invention.

FIG. 3 illustrates a structural diagram of a system for playing an enterprise CRBT according to an embodiment of the present invention. The system includes a service switching entity and a service access entity. Particularly, the service access entity includes a first reception unit 11, a search unit 12 and a play unit 13. The first reception unit 11 is adapted to receive a service identifier of a destination terminal sent by a source terminal. The search unit 12 is adapted to search for a connection identifier corresponding to the service identifier of the destination terminal according to a correspondence relationship between the service identifier and the connection identifier of the terminal and send the connection identifier of the destination terminal to the service switching entity. The play unit 13 is adapted to play an enterprise CRBT to the source terminal.

The service switching entity includes a second reception unit 21, a first connection unit 22 and a second connection unit 23. The second reception unit 21 is adapted to receive a call request including an EVC access code sent by the source terminal, and the connection identifier of the destination terminal sent by the service access entity. The first connection unit 22 is adapted to establish a connection with the service access entity according to the EVC access code. The second connection unit 23 is adapted to establish a connection between the source terminal and the destination terminal according to the connection identifier of the destination terminal.

The system can include a service control entity which includes a first control unit 31 adapted to control the service switching entity to disconnect the connection with the service access entity when the destination terminal answers.

The service control entity can further include a second control unit 32 adapted to control the service switching entity to establish the connection with the service access entity upon reception of the call request including the EVC access code sent by the service switching entity. Then the service switching entity can include a sending unit 24 adapted to send the call request to the second control unit 32.

The service switching entity can include a disconnection unit 25 adapted to disconnect the connection with the service access entity after receiving the connection identifier of the destination terminal and before establishing the connection between the source terminal and the destination terminal. Furthermore, the service switching entity can include a third connection unit 26 adapted to establish the connection with the service access entity after establishing the connection between the source terminal and the destination terminal and before the service access entity plays the stored enterprise CRBT to the source terminal.

Figure 4:
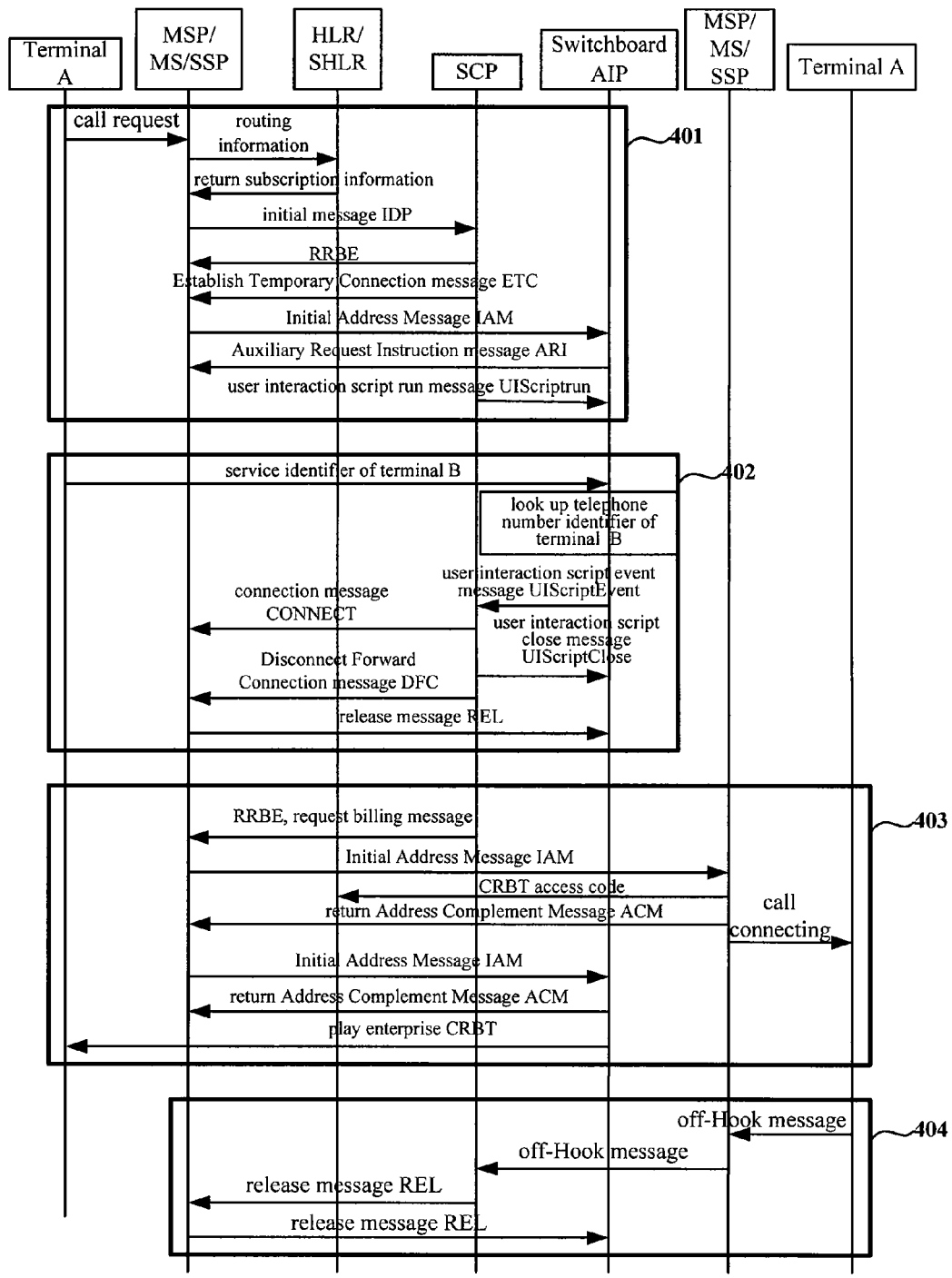
FIG. 4 is a flow chart of a method for playing an enterprise CRBT according to an embodiment of the present invention.

The inventive method will be described in details below with reference to an embodiment. FIG. 4 illustrates a flow chart of a method for playing an enterprise CRBT according to an embodiment of the invention, in which MS/MSC refers to a service switching entity, terminal A refers to a source terminal, terminal B refers to a destination terminal, MS/MSC(a) refers to a service switching entity serving terminal A, MS/MSC(b) refers to a service switching entity serving terminal B, SCP refers to a service control entity, and switchboard AIP refers to a service access entity. The method includes the following steps.

Step 401: Terminal A sends to MS/MSC(a) a call request including an EVC access code, and MS/MSC(a) establishes a connection with the switchboard AIP according to the EVC access code.

In this step, terminal A first sends to MS/MSC(a) the call request including information of the EVC access code. In this embodiment, it can be assumed that the procedure of sending the call request is accomplished in a way that terminal A dials the EVC access code and the call is switched to MS/MSC(a). Upon reception of the call request, MS/MSC(a) determines whether terminal A is a mobile network device or a fixed network device. If terminal A is a mobile network device, MS/MSC(a) obtains T_CSI information of the EVC access code by sending routing information (SRI) including the EVC access code to an HLR; and if terminal A is a fixed network device, MS/MSC(a) obtains the T_CSI information of the EVC access code by sending routing information (SRI) including the EVC access code to a smart home location register (SHLR).

In this embodiment, MS/MSC(a) sends a trigger signal to the SCP upon reception of the SRI information of the EVC access code, and the SCP controls MS/MSC(a) to establish a connection with the switchboard AIP. Particularly, SSP(a) at the MS/MSC(a) side sends a DIP message including the EVC access code information as the trigger signal to the SCP. Upon reception of the IDP message, the SCP determines that the EVC service is to be implemented according to the EVC access code information in the message, and issues an RRBE message to MS/MSC(a) for real time monitoring of the link connection status. An establish temporary connection (ETC) message including routing information of the switchboard AIP is also issued to instruct MS/MSC(a) to establish the connection with the switchboard AIP. Thus, MS/MSC(a) sends to the switchboard AIP an IAM message including the routing information of the switchboard AIP and establishes the connection between them.

After the connection is established, the switchboard AIP sends an auxiliary request instruction (ARI) message to the SCP, by which a connection with the SCP is established, and thereafter the SCP sends to the switchboard AIP a user interaction script run UIScriptrun message instructing the switchboard AIP to start a switchboard service flow.

Step 402: Terminal A sends a service identifier of terminal B to the switchboard AIP, and the switchboard AIP searches for a connection identifier of terminal B according to a stored correspondence relationship between the service identifier and the connection identifier of the terminal and sends the connection identifier to MS/MSC(a).

After MS/MSC(a) establishes the connection with the switchboard AIP, i.e. terminal A establishes a session connection with the switchboard AIP through MS/MSC(a), the service identifier of terminal B is sent to the switchboard AIP. In this invention, the service identifier is an identifier, which can indicate the identity of terminal B, for example, a name identifier of terminal B, other than the connection identifier. For example, if the switchboard AIP provides terminal A with a manual service, terminal A speaks out the name of terminal B, i.e. name of the user, then an operator can obtain connection information of terminal B by looking up the pre-stored correspondence relationship between the service identifier and the connection identifier of the terminal. In this embodiment, the connection identifier is a telephone number. After obtaining telephone number information of terminal B, the switchboard AIP sends the information to MS/MSC(a), and in this embodiment, the switchboard AIP reports the telephone number information of terminal B by sending a user interaction script event (UIScriptEvent) message to the SCP. After obtaining the telephone number information of terminal B, the SCP sends to MS/MSC(a) a CONNECT message including the telephone number of terminal B. In order to achieve no reduplicate links in the call forwarding, MS/MSC(a) needs to disconnect the connection with the switchboard AIP after obtaining the telephone number of terminal B, And in this embodiment, the disconnection step can be as follows: upon reception of the telephone number of terminal B reported by the switchboard AIP, the SCP determines that terminal B has subscribed for the enterprise CRBT service and sends a user interaction script close (UIScriptClose) message to the switchboard AIP to release the connection with the switchboard AIP. Also the SCP sends to MS/MSC(a) a Disconnect Forward Connection (DFC) message instructing MS/MSC(a) to tear down the temporary session connection with the switchboard AIP, then MS/MSC(a) sends a REL message to the switchboard AIP and disconnects the connection between them.

Step 403: MS/MSC(a) establishes the connection between terminal A and terminal B according to the telephone number information of terminal B, and the switchboard AIP plays an enterprise CRBT to terminal A.

After obtaining the telephone number information of terminal B, MS/MSC(a) establishes the connection between terminal A and terminal B according to the telephone number information. Apparently, MS/MSC(a) can also disconnect the connection with the switchboard AIP after establishing the connection between terminal A and terminal B according to the obtained telephone number information of terminal B.

Next, the SCP sends a request report basic call state model event (RRBE) and an application charging (AC) message to MS/MSC(a), instructing MS/MSC(a) to monitor in real time events at the terminal such as off-hook, no-answer, routing selection failure and report a billing report.

In the above step 402, the CONNECT message sent by the SCP further includes a CRBT routing identifier, an EVC access code and a CRBT access identifier. Particularly, the CRBT routing identifier and the EVC access code are used to instruct MS/MSC(a) to connect the call to the switchboard AIP, so that the switchboard AIP can play an enterprise CRBT to terminal A. The CRBT access code and the telephone number of terminal B are used to notify the HLR that the CRBT service has been triggered and do not trigger the CRBT service for terminal B again, thereby avoiding repetitions. Specifically, upon reception of the CONNECT message, MS/MSC(a) sends to MS/MSC(b) an IAM message including the telephone number of terminal B and the CRBT access code, and MS/MSC(b) further sends the CRBT access code to the HLR at the destination end instructing the HLR not to trigger the CRBT service for terminal B again according to the CRBT access code, and sends an ACM message to MS/MSC(a). Thereafter MS/MSC(a) establishes the connection with the switchboard AIP through an IAM message according to the obtained EVC access code. If the switchboard AIP stores more than one enterprise CRBTs, MS/MSC(a) sends the CRBT routing identifier to the switchboard AIP, and the switchboard AIP finds one of the enterprise CRBTs corresponding to the CRBT routing identifier according to a correspondence relationship between the CRBT routing identifier and the enterprise CRBT, returns an ACM message to MS/MSC(a), and triggers a play process for the enterprise CRBT to play stored audio data to terminal A.

Step 404: When terminal B answers, the SCP controls MS/MSC(a) to disconnect the connection with the switchboard AIP.

When the terminal B is off-hook, i.e. an off-hook message is sent to MS/MSC(b), the SSP(b) at the MS/MSC(b) side reports an off-hook message of terminal B to the SCP. Upon reception of the message, the SCP sends a REL message to MS/MSC(a) to control MS/MSC(a) to disconnect the connection with the telephone AIP. Upon reception of the REL message, MS/MSC(a) sends a REL message to the switchboard AIP and disconnects the connection with the switchboard AIP, then the switchboard stops playing the enterprise CRBT to terminal A, and terminals A and B start to communicate.

Figure 5:
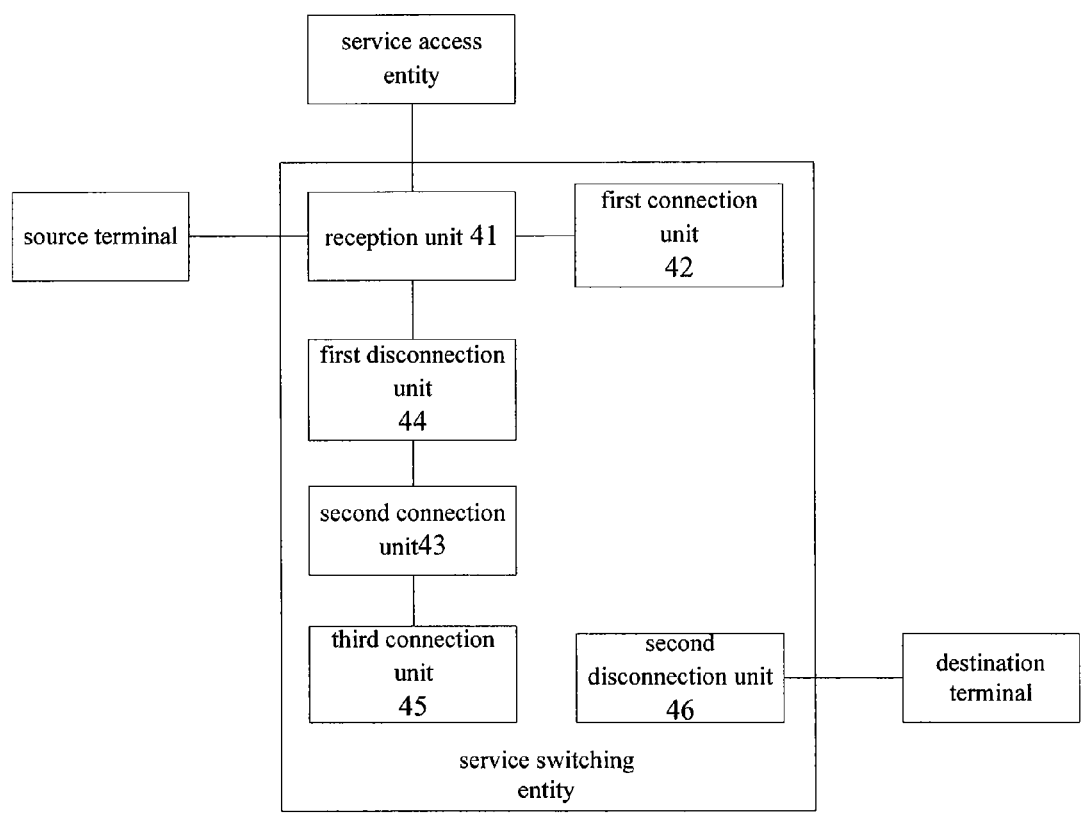
FIG. 5 is a structural diagram of a service switching entity according to an embodiment of the present invention.

With the above detailed descriptions of the method and the system of the present invention, an embodiment of the present invention further provides a service switching entity as illustrated in FIG. 5, which is applicable in a system including a service access entity and at least two terminals. The service switching entity includes a reception unit 41, a first connection unit 42 and a second connection unit 43. The reception unit 41 is adapted to receive a call request including an EVC access code sent by a source terminal, and a connection identifier of a destination terminal sent by the service access entity. The first connection unit 42 is adapted to establish a connection with the service access entity according to the EVC access code. The second connection unit 43 is adapted to establish a connection between the source terminal and the destination terminal according to the connection identifier of the destination terminal.

The service switching entity can include a first disconnection unit 44 adapted to disconnect the connection with the service access entity after receiving the connection identifier of the destination terminal and before establishing the connection between the source terminal and the destination terminal. The service switching entity can include a third connection unit 45 adapted to establish the connection with the service access entity after establishing the connection between the source terminal and the destination terminal and before the service access entity plays a stored enterprise CRBT to the source terminal.

The service switching entity can further include a second disconnection unit 46 adapted to disconnect the connection with the service access entity when the destination terminal answers.

With the present invention, playing of enterprise CRBTs can be realized in both wired communication network and wireless communication networks without reduplicate links, and the enterprise CRBT service can be implemented at the service access entity side, which simplifies maintenance operations and reduces system burden, therefore a calling party can hear an enterprise CRBT when dialing an EVC access code and hear a personal CRBT of an enterprise member when directly dialing an internal user of an enterprise.

Evidently, those skilled in the art may make modifications and variations of the invention without departing from the scope of the invention. Accordingly, the invention is intended to include these modifications and variations provided that they come into the scope of the claims appended to the invention and equivalents thereof.

What is claimed is:

1. A method for playing an enterprise Color RingBack Tone, CRBT, comprising:
   receiving, by a service switching entity, a call request comprising an Enterprise Virtual Centrex, EVC, access code sent by a source terminal, and establishing a connection with a service access entity in accordance with the EVC access code;
   receiving, by the service access entity, a service identifier of a destination terminal sent by the source terminal, searching for a connection identifier of the destination terminal corresponding to the service identifier of the destination terminal in accordance with a correspondence relationship between the service identifier and the connection identifier of the destination terminal, and sending the connection identifier of the destination terminal to the service switching entity; and after the service access entity sends the connection identifier of the destination terminal to the service witching entity and before the service switching entity establishes the connection between the source terminal and the destination terminal in accordance with the connection identifier of the destination terminal the method comprises: disconnecting by the service switching entity the connection with the service access entity; and after the service switching entity establishes the connection between the source terminal and the destination terminal in accordance with the connection identifier of the destination terminal and before the service access entity plays the enterprise CRBT to the source terminal the method further comprises: establishing by the service switching entity the connection with the service access entity;
   and playing, by the service access entity, an enterprise CRBT to the source terminal.

2. The method according to claim 1, further comprising:
   controlling, by a service control entity, the service switching entity to disconnect the connection with the service access entity when the destination terminal answers.

3. The method according to claim 1, wherein the step of the establishing, by the service switching entity, the connection with the service access entity in accordance with the EVC access code comprises:
   sending, by the service switching entity, a trigger signal to a service control entity in accordance with the EVC access code; and
   controlling, by the service control entity, the service switching entity to establish the connection with the service access entity.

4. The method according to claim 3, wherein the step of controlling, by the service control entity, the service switching entity to establish the connection with the service access entity comprises:
   sending, by the service control entity, to the service switching entity an Establish Temporary Connection message comprising routing information of the service access entity; and
   establishing, by the service switching entity, the connection with the service access entity in accordance with the routing information.

5. The method according to claim 1, wherein a service control entity controls the service switching entity to disconnect the connection with the service access entity.

6. The method according to claim 1, wherein a service control entity controls the service switching entity to establish the connection with the service access entity.

7. The method according to claim 5, wherein the step of the service control entity controlling the service switching entity to disconnect the connection with the service access entity comprises:
   sending, by the service control entity, a Disconnect Forward Connection message to the service switching entity; and
   sending, by the service switching entity, a release message to the service access entity to disconnect the connection.

8. The method according to claim 6, wherein the step of the service control entity controlling the service switching entity to establish the connection with the service access entity comprises:
   sending, by the service control entity, to the service switching entity a connection message comprising the EVC access code; and
   establishing, by the service switching entity, the connection with the service access entity in accordance with the EVC access code.

9. The method according to claim 8, wherein if the service access entity stores more than one enterprise CRBTs, the connection message further comprises a CRBT routing identifier, the service switching entity sends the CRBT routing identifier to the service access entity, and the service access entity searches for an enterprise CRBT corresponding to the CRBT routing identifier in accordance with a correspondence relationship between the CRBT routing identifier and the enterprise CRBT.

10. The method according to claim 8, wherein the connection message further comprises a CRBT access identifier, and the service switching entity sends the CRBT access identifier to a home location entity of the destination terminal, instructing the home location entity not to trigger a CRBT service for the destination terminal.

11. The method according to claim 1, wherein the step of sending the connection identifier of the destination terminal to the service switching entity comprises:
   sending, by the service access entity, the connection identifier of the destination terminal to a service control entity; and
   sending, by the service control entity, the connection identifier of the destination terminal to the service switching entity.

12. A system for playing an enterprise color ringback tone, CRBT, comprising a service switching entity and a service access entity, wherein:
   the service access entity comprises:
   a first reception unit, adapted to receive a service identifier of a destination terminal sent by a source terminal;
   a search unit, adapted to search a connection identifier corresponding to the service identifier of the destination terminal in accordance with a correspondence relationship between the service identifier and the connection identifier of the terminal, and to send the connection identifier of the destination terminal to the service switching entity; and a play unit adapted to play an enterprise CRBT to the source terminal;

and the service switching entity comprises:

a second reception unit, adapted to receive a call request comprising an Enterprise Virtual Centrex, EVC, access code sent by the source terminal, and the connection identifier of the destination terminal by the service access entity;

a first connection unit, adapted to establish a connection with the service access entity in accordance with the EVC access code; and a second connection unit, adapted to establish a connection between the source terminal and the destination terminal in accordance with the connection identifier of the destination terminal a disconnection unit adapted to disconnect the connection with the service access entity after receiving the connection identifier of the destination terminal and before establishing the connection between the source terminal and the destination terminal; and a third connection unit adapted to establish the connection with the service access entity after establishing the connection between the source terminal and the destination terminal and before the service access entity plays the enterprise CRBT to the source terminal.

13. The system according to claim 12, further comprising a service control entity, wherein the service control entity comprises a first control unit, adapted to control the service switching entity to disconnect the connection with the service access entity when the destination terminal answers.

* * * * *

UNITED STATES PATENT AND TRADEMARK OFFICE
CERTIFICATE OF CORRECTION

| | | |
|---|---|---|
| PATENT NO. | : 8,149,998 B2 | Page 1 of 1 |
| APPLICATION NO. | : 12/511232 | |
| DATED | : April 3, 2012 | |
| INVENTOR(S) | : Li et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 381 days.

Signed and Sealed this
Twenty-fifth Day of September, 2012

David J. Kappos
*Director of the United States Patent and Trademark Office*